D. R. PRINDLE.
Broadcast-Seeder.

No. 62,286.            Patented Feb. 19, 1867.

United States Patent Office.

DANIEL R. PRINDLE, OF EAST BETHANY, NEW YORK.

Letters Patent No. 62,286, dated February 19, 1867.

IMPROVEMENT IN SEED SOWERS.

The Schedule referred to in these Letters Patent and making part of the same.

TO ALL WHOM IT MAY CONCERN:

Be it known that I, DANIEL R. PRINDLE, of East Bethany, in the county of Genesee, and in the State of New York, have invented certain new and useful improvements in "Broadcast Grass-Seed Sowers;" and do hereby declare that the following is a full, clear, and exact description thereof, reference being had to the accompanying drawings, and the letters of reference marked thereon, making a part of this specification.

My invention has for its objects the regularity in the distribution of seed, and the construction of a simple and practical device to prevent the clogging of the seed within the hopper, and to effectually draw the seed under the seed-bar.

Figure 1:
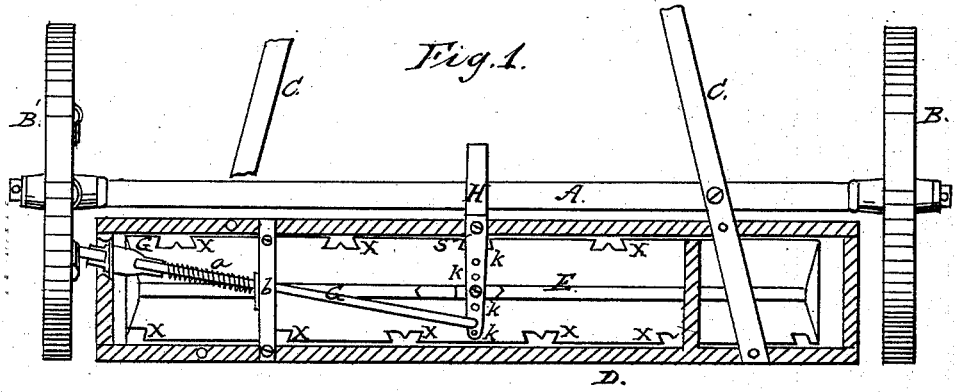
Figure 2:
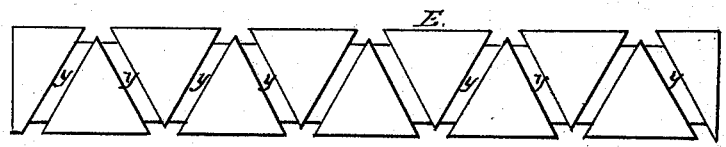

In the annexed drawings, A represents a suitable axle, with wheels B B' attached, and provided with shafts C C. These shafts are bolted upon the axle, and extend slightly to the rear thereof, as shown. D represents the hopper, which is constructed of the usual form, and which is attached to the projecting ends of the shafts C C. The top of this hopper is on a line with the axle, and so placed that its perforated bottom may be quite near the earth, which causes the seed to drop directly upon the ground, and prevents the scattering thereof by the wind. Lying upon the bottom of the hopper D is the horizontal seed-bar E; which bar is made in somewhat of a convex shape, with the flat surface upon the perforated hopper bottom. At each side of the bar are a series of small bevelled openings $x\ x$, through which the seed is drawn. The bottom of the bar has a series of diagonal grooves, $y\ y$, Figure 2, which extend from end to end of the said bar, thereby forming V-shaped blocks and small points in the centre of the bevelled openings $x$, so that the seed is effectually drawn upon the hopper bottom, and, by the reciprocating motion, forced down through the hopper and upon the ground. The peculiar shape of this bar not only allows the seed to fall direct upon the bottom, but into the openings, where the projections of the openings $x$ draw it into the zigzag grooves. G represents the reciprocating metallic bar, which operates the seed-bar E. This bar has a small wheel, or equivalent, at its outer end, which works in the cam upon the inner face of wheel B', and is connected at the inner end to the index H. It will be seen that this bar has a coil spring, $a$, and passes under a rest, $b$, near one end of the hopper, as seen in Figure 1, to prevent the jarring of the rod, and secure it in the desired position; also as a brace for the coil spring $a$. The index H is placed at the centre of the hopper, and extends over the front of axle. While being pivoted to the forward rail of the hopper at $s$, it is also pivoted to a small bar or rise on the centre of bar E, and, by means of its small openings $k\ k$, can be regulated to operate the seed-bar for the distribution of the various quantities of seed. The hook upon the inner end of the bar G is intended to fit in any of the openings $k$ upon the index, for the regulating of the seed, as above described.

Having thus fully described my invention, what I claim as new, and desire to secure by Letters Patent, is—

1. The seed-bar E, constructed as described, and used in the manner and for the purposes set forth.

2. The hopper D, with rod G, and spring with index H, and rest $b$, all constructed, arranged, and operating in the manner substantially as herein set forth.

In testimony that I claim the foregoing I have hereunto set my hand and seal this 26th day of December, 1866.

D. R. PRINDLE.

Witnesses:
C. M. ALEXANDER,
J. M. MASON.